United States Patent
Iida et al.

(10) Patent No.: US 12,404,973 B2
(45) Date of Patent: Sep. 2, 2025

(54) TANK

(71) Applicant: TOYOTA JIDOSHA KABUSHIKI KAISHA, Toyota (JP)

(72) Inventors: Yasuhiro Iida, Toyota (JP); Takeshi Ishikawa, Toyokawa (JP); Takuya Kobayashi, Toyota (JP); Naoki Ueda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/455,586

(22) Filed: Aug. 24, 2023

(65) Prior Publication Data

US 2024/0093834 A1    Mar. 21, 2024

(30) Foreign Application Priority Data

Sep. 16, 2022   (JP) .................... 2022-147978

(51) Int. Cl.
*F17C 1/06*   (2006.01)

(52) U.S. Cl.
CPC ........ *F17C 1/06* (2013.01); *F17C 2201/0109* (2013.01); *F17C 2203/012* (2013.01);
(Continued)

(58) Field of Classification Search
CPC ............... F17C 1/06; F17C 2201/0109; F17C 2203/012; F17C 2203/0604; F17C 2203/0624; F17C 2203/067; F17C 2203/0673; F17C 2260/011; F17C 2270/0168
(Continued)

(56) References Cited

U.S. PATENT DOCUMENTS

2010/0276434 A1* 11/2010 Berger .............. F17C 1/16
                                                  427/372.2
2010/0294776 A1   11/2010 Liu
(Continued)

FOREIGN PATENT DOCUMENTS

JP   2019527321 A   9/2019
JP   2021110367 A   8/2021
(Continued)

OTHER PUBLICATIONS

English Machine Translation of WO-2018066293-A1 (Year: 2018).*

*Primary Examiner* — Don M Anderson
*Assistant Examiner* — Laura E. Parker
(74) *Attorney, Agent, or Firm* — Hunton Andrews Kurth LLP

(57) ABSTRACT

A tank includes a liner and a reinforcement layer. The liner has a body portion with a cylindrical shape, and a pair of dome-shaped portions respectively provided at both ends of the body portion in an axial direction of the body portion. The reinforcement layer covers the liner and is made of a fiber reinforced resin that is a resin-impregnated fiber bundle. The reinforcement layer includes a part reinforcement layer disposed from an apex side of each of the dome-shaped portions across a boundary between the dome-shaped portion and the body portion to part of the body portion, and an outer hoop layer disposed outside the part reinforcement layer and provided so as to press an end, adjacent to the body portion, of the part reinforcement layer.

1 Claim, 4 Drawing Sheets

(52) U.S. Cl.
CPC ............. *F17C 2203/0604* (2013.01); *F17C 2203/0624* (2013.01); *F17C 2203/067* (2013.01); *F17C 2203/0673* (2013.01); *F17C 2221/012* (2013.01); *F17C 2221/033* (2013.01); *F17C 2221/035* (2013.01); *F17C 2260/011* (2013.01); *F17C 2270/0168* (2013.01); *F17C 2270/0184* (2013.01)

(58) Field of Classification Search
USPC ............................... 220/590, 581, 588, 589
See application file for complete search history.

(56) References Cited

U.S. PATENT DOCUMENTS

| | | | | |
|---|---|---|---|---|
| 2012/0024746 | A1* | 2/2012 | Otsubo | B29C 63/10 |
| | | | | 156/187 |
| 2021/0213689 | A1* | 7/2021 | Maeda | B29C 70/32 |
| 2021/0293380 | A1* | 9/2021 | Fujii | B29C 70/205 |
| 2022/0032531 | A1* | 2/2022 | Katano | B29C 53/602 |
| 2022/0034450 | A1* | 2/2022 | Katano | B29C 70/32 |

FOREIGN PATENT DOCUMENTS

| | | | | |
|---|---|---|---|---|
| JP | 2022026666 | A | 2/2022 | |
| WO | 2018007367 | A1 | 1/2018 | |
| WO | WO-2018066293 | A1 * | 4/2018 | ............... F16J 12/00 |

* cited by examiner

TANK

CROSS-REFERENCE TO RELATED APPLICATION

This application claims priority to Japanese Patent Application No. 2022-147978 filed on Sep. 16, 2022, incorporated herein by reference in its entirety.

BACKGROUND

1. Technical Field

The disclosure relates to a tank.

2. Description of Related Art

A tank, such as a hydrogen tank, is described in, for example, Japanese Unexamined Patent Application Publication (Translation of PCT Application) No. 2019-527321 (JP 2019-527321 A). The tank described in JP 2019-527321 A includes a liner and a reinforcement layer. The liner has a body portion and a pair of dome-shaped portions. The body portion has a cylindrical shape. The dome-shaped portions are respectively provided at both ends of the body portion in an axial direction of the body portion. The reinforcement layer is provided so as to cover the liner. The reinforcement layer is formed by winding a resin-impregnated fiber bundle around the outer periphery of the liner by a filament winding (FW) method. More specifically, the reinforcement layer is made up of a first tape and a second tape. The first tape is placed so as to be wound around the liner by helical winding or hoop winding. The second tape is placed within a range shorter than the diameter of the body portion so as to pass around at least the dome-shaped portions.

SUMMARY

In the tank, the strength of each dome-shaped portion (in other words, the strength of the tank in the axial direction) is ensured by helical winding, and the strength of the body portion (in other words, the radial strength of the tank) is ensured by hoop winding. Helical winding is a method of spirally winding a fiber bundle around the outer peripheries of the dome-shaped portions and the body portion, so the fiber bundle formed by helical winding is formed not only on the dome-shaped portions but also on the body portion. However, the fiber bundle formed by helical winding contributes to reinforcement of the body portion just a little.

In the tank described in JP 2019-527321 A, a fiber bundle is continuously wound so as to shuttle between the dome-shaped portions respectively provided at both ends of the liner by helical winding, so the fiber bundle definitely passes across the body portion. Therefore, there is an inconvenience that some usage of fiber reinforced resin, that is, a resin-impregnated fiber bundle, is wasted. For this reason, a tank that ensures the strength of each dome-shaped portion and that reduces the usage of fiber reinforced resin is desired.

The disclosure provides a tank that ensures the strength of each dome-shaped portion and reduces the usage of fiber reinforced resin.

An aspect of the disclosure relates to a tank. The tank includes a liner and a reinforcement layer. The liner has a body portion with a cylindrical shape, and a pair of dome-shaped portions respectively provided at both sides of the body portion in an axial direction of the body portion. The reinforcement layer covers the liner and is made of a fiber reinforced resin that is a resin-impregnated fiber bundle. The reinforcement layer includes a part reinforcement layer disposed from an apex side of each of the dome-shaped portions across a boundary between the dome-shaped portion and the body portion to part of the body portion, and an outer hoop layer disposed outside the part reinforcement layer and provided so as to press an end, adjacent to the body portion, of the part reinforcement layer.

With the tank according to the aspect of the disclosure, since the part reinforcement layer is disposed from the apex side of each of the dome-shaped portions across the boundary between the dome-shaped portion and the body portion to part of the body portion, each of the dome-shaped portions is reinforced by the part reinforcement layer. For this reason, the amount of helical layer used to reinforce the dome-shaped portions is reduced, so an amount to form a helical layer on the body portion also reduces with formation of the helical layer. As a result, the strength of each of the dome-shaped portions is ensured, and the usage of fiber reinforced resin is reduced as compared to an existing art.

In the tank according to the aspect of the disclosure, the end of the part reinforcement layer may be inclined from an outside of the tank toward an inside of the tank such that a thickness of the end reduces.

With this configuration, a step is less likely to be formed at the end of the part reinforcement layer, so the influence of the step on the outer hoop layer is reduced. Therefore, a gap between the part reinforcement layer and the outer hoop layer disposed outside the part reinforcement layer is reduced to enhance adhesion between the part reinforcement layer and the outer hoop layer, so interlayer peeling is suppressed. As a result, the end of the part reinforcement layer is stably pressed by the outer hoop layer, and the part reinforcement layer is reliably fixed.

In the tank according to the aspect of the disclosure, the reinforcement layer may further include an inner hoop layer disposed inside the part reinforcement layer so as to sandwich the end of the part reinforcement layer with the outer hoop layer. With this configuration, the end of the part reinforcement layer is further stabilized by sandwiching the end of the part reinforcement layer with the outer hoop layer and the inner hoop layer.

In the tank according to the aspect of the disclosure, the inner hoop layer may be made up of split elements having a cylindrical shape and prepared in advance. With this configuration, the inner hoop layer is easily manufactured.

In the tank according to the aspect of the disclosure, both ends of the inner hoop layer in the axial direction each may be an inclined end inclined from an outside of the tank toward an inside of the tank such that a thickness of the inclined end reduces, and the end of the part reinforcement layer may be disposed adjacent to a center of the body portion with respect to the inclined end of the inner hoop layer.

Since both ends of the body portion in the axial direction in the inner hoop layer are inclined ends in this way, a step is less likely to be formed at each inclined end, with the result that the influence of the step on the part reinforcement layer is reduced. Therefore, a gap between the inner hoop layer and the part reinforcement layer disposed outside the inner hoop layer is reduced to enhance adhesion between the inner hoop layer and the part reinforcement layer, so interlayer peeling is suppressed. Since the end of the part reinforcement layer is disposed adjacent to the center of the body portion with respect to the inclined end of the inner hoop layer, that is, the end of the part reinforcement layer is disposed on the body portion that is relatively flat, so pressing of the outer hoop layer against the end of the part reinforcement layer is stabilized.

According to the aspect of the disclosure, it is possible to provide a tank that ensures the strength of each dome-shaped portion and that reduces the usage of fiber reinforced resin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
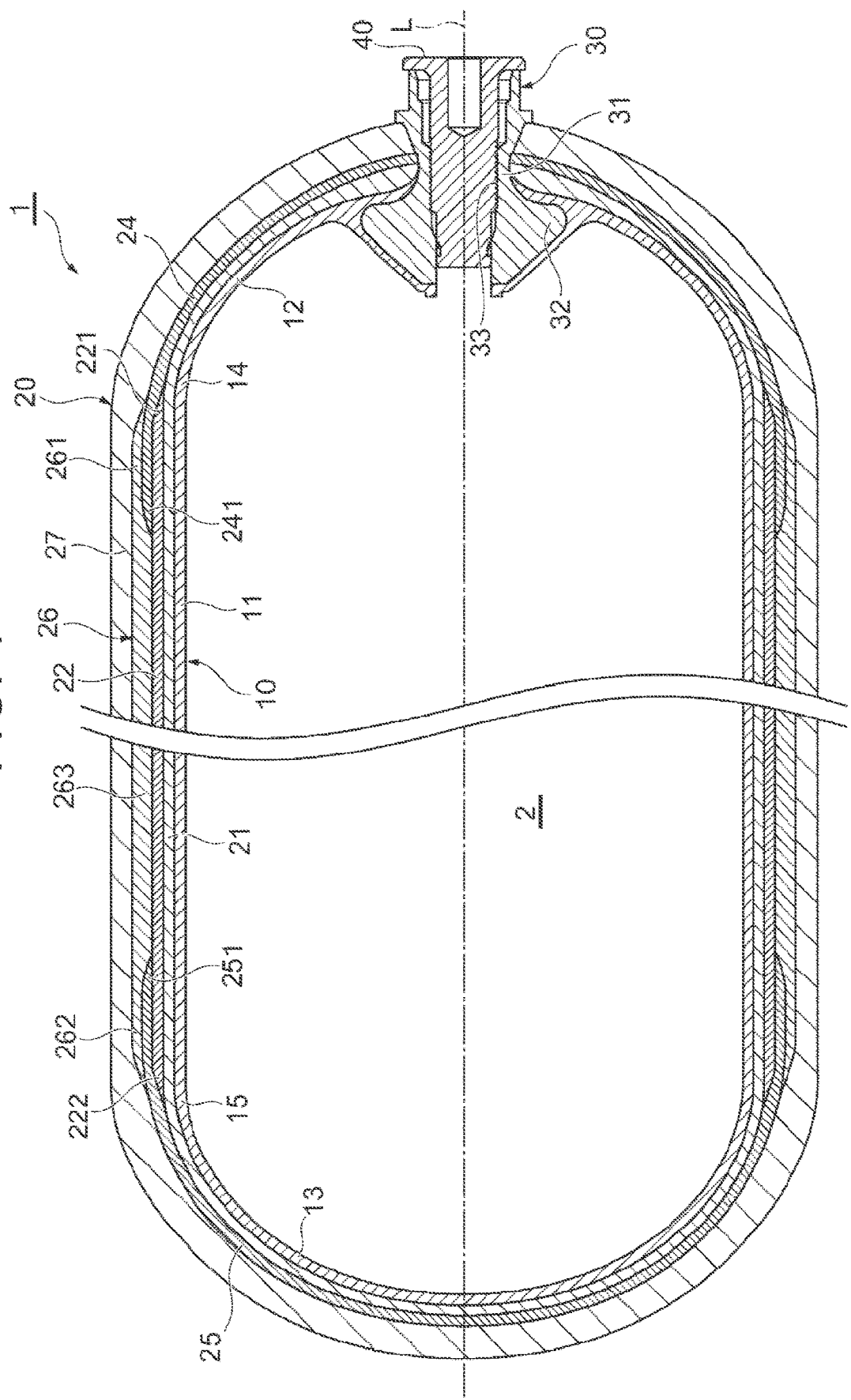
FIG. 1 is a sectional view that shows a tank according to a first embodiment.

Hereinafter, embodiments of a tank according to the disclosure will be described with reference to the accompanying drawings. Like reference numerals denote the same elements in the description of the drawings, and the description thereof will not be repeated. In the following description, an example in which the tank is mounted on a fuel cell electric vehicle and is filled with high-pressure hydrogen gas inside will be described. A gas allowed to be filled into the tank is not limited to hydrogen gas. Examples of the gas may include a compressed gas, such as compressed natural gas (CNG), and various liquefied gases, such as liquefied natural gas (LNG) and liquefied petroleum gas (LPG).

First Embodiment

Figure 2:
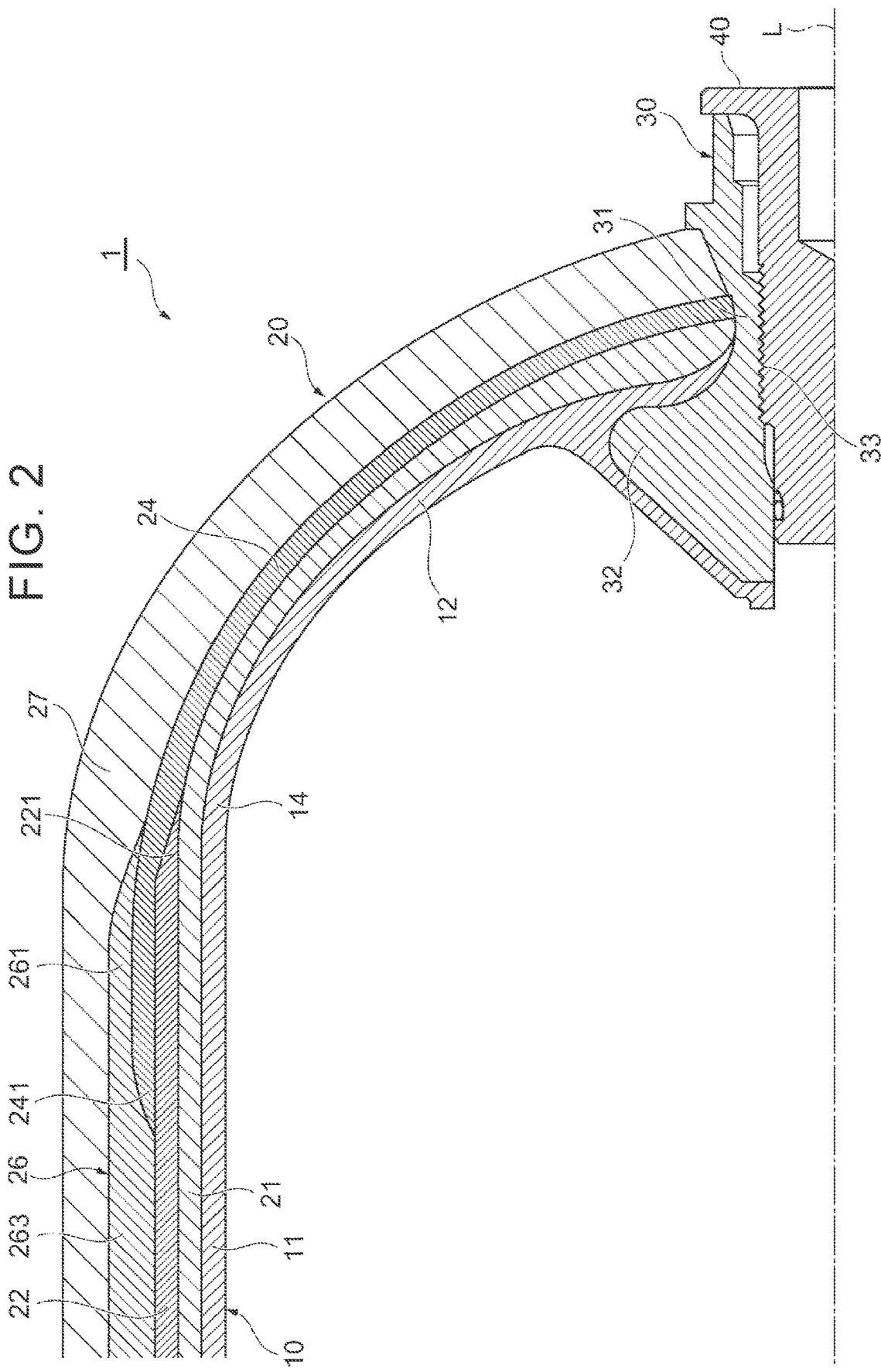
FIG. 2 is a partially enlarged sectional view that shows the tank according to the first embodiment.

FIG. 1 is a sectional view that shows a tank according to a first embodiment. FIG. 2 is a partially enlarged sectional view that shows the tank according to the first embodiment. As shown in FIG. 1, the tank 1 according to the present embodiment is a high-pressure gas storage container having a substantially cylindrical shape with both ends rounded in a dome shape. The tank 1 includes a liner 10, a reinforcement layer 20, an end fitting 30, and a valve 40. The liner 10 has gas barrier properties. The reinforcement layer is formed so as to cover the outer periphery of the liner 10. The end fitting 30 is fitted to one end of the tank 1. The valve 40 closes the end fitting 30.

The liner 10 is a hollow container having a storage space 2 for storing high-pressure hydrogen. The liner 10 is made of a resin material having gas barrier properties against hydrogen gas. The liner 10 is made up of a body portion 11 having a cylindrical shape, and a pair of dome-shaped portions (a first dome-shaped portion 12 and a second dome-shaped portion 13) respectively provided at both ends of the body portion 11 in an axial direction (that is, an axis L direction of the tank 1). The body portion 11 extends in the axis L direction of the tank 1 by a predetermined length. For example, the first dome-shaped portion 12 is disposed on the right side of the body portion 11, and the second dome-shaped portion 13 is disposed on the left side of the body portion 11. Each of the first dome-shaped portion 12 and the second dome-shaped portion 13 has a hemispherical shape such that the diameter reduces with distance from the body portion 11. In the present embodiment, a boundary between first dome-shaped portion 12 having a hemispherical shape and the body portion 11 having a cylindrical shape is indicated by reference numeral 14, and a boundary between the second dome-shaped portion 13 having a hemispherical shape and the body portion 11 having a cylindrical shape is indicated by reference numeral 15.

An opening is provided at the apex of one (in the present embodiment, the first dome-shaped portion 12) of the dome-shaped portions, and the end fitting 30 integrally molded with the liner 10 is inserted through the opening. On the other hand, the second dome-shaped portion 13 has no opening. Alternatively, the second dome-shaped portion 13 may have an opening through which an end fitting 30 is inserted, as in the case of the first dome-shaped portion 12.

The thus configured liner 10 may be formed by forming a body split element, a first dome-shaped portion split element, and a second dome-shaped portion split element through injection molding, blow molding, or the like by using, for example, a resin material, such as polyethylene and nylon, and coupling these split elements, or may be integrally formed by rotational and blow molding by using a resin material, such as polyethylene and nylon.

The reinforcement layer 20 has the function to reinforce the liner 10 and improve mechanical strength, such as stiffness and pressure resistance, of the tank 1. The reinforcement layer 20 has a plurality of layers made of a fiber reinforced resin. The fiber reinforced resin is, for example, formed by impregnating a fiber bundle with a thermosetting resin or a thermoplastic resin. The fiber bundle is a bundle of fiber with a diameter of about several micrometers. Examples of the fiber may include carbon fiber, glass fiber, aramid fiber, alumina fiber, boron fiber, steel fiber, PBO fiber, natural fiber, and reinforced fiber, such as high-strength polyethylene fiber. Particularly, from the viewpoint of light weight, mechanical strength, and the like, carbon fiber is preferably used.

Examples of the thermosetting resin include epoxy resin, modified epoxy resin as typified by vinyl ester resin, phenolic resin, melamine resin, urea resin, unsaturated polyester resin, alkyd resin, polyurethane resin, and thermosetting polyimide resin. Examples of the thermoplastic resin include polyether ether ketone, polyphenylene sulfide, polyacrylic ester, polyimide, and polyamide.

As shown in FIG. 1, the reinforcement layer 20 includes an inner helical layer 21, an inner hoop layer 22, a first part reinforcement layer 24, a second part reinforcement layer 25, an outer hoop layer 26, and an outer helical layer 27. The inner helical layer 21 covers the whole of the liner 10. The inner hoop layer 22 is disposed outside the inner helical layer 21 at a location corresponding to the body portion 11 of the liner 10. The first part reinforcement layer 24 is disposed outside the inner helical layer 21 at a location corresponding to the first dome-shaped portion 12 of the liner 10. The second part reinforcement layer 25 is disposed outside the inner helical layer 21 at a location corresponding to the second dome-shaped portion 13 of the liner 10. The outer hoop layer 26 is formed so as to press an end 241 of the first part reinforcement layer 24 and an end 251 of the second part reinforcement layer 25. The outer helical layer 27 is disposed outside the outer hoop layer 26 and formed so as to cover the whole of the liner 10.

The inner helical layer 21 is formed by helical winding of a resin-impregnated fiber bundle around the outer peripheries of the body portion 11, first dome-shaped portion 12, and second dome-shaped portion 13.

The inner hoop layer 22 is formed by hoop winding of a resin-impregnated fiber bundle at a location corresponding to the body portion 11 on the outer periphery of the inner helical layer 21. As shown in FIG. 1 and FIG. 2, in the axial direction (that is, the axis L direction of the tank 1) of the body portion 11, one end (for example, an end closer to the first dome-shaped portion 12) of the inner hoop layer 22 is an inclined end 221 that is inclined from the outside of the tank 1 toward the inside such that the thickness reduces. The other end (for example, an end close to the second dome-shaped portion 13) of the inner hoop layer 22 is an inclined end 222 that is inclined from the outside of the tank 1 toward the inside such that the thickness reduces.

A method of forming the inclined ends 221, 222 of the inner hoop layer 22 includes, for example, forming a first-layer hoop layer by hoop winding of a resin-impregnated fiber bundle from one end toward the other end in the axial direction of the body portion 11, forming a second-layer hoop layer by hoop winding of the fiber bundle from the other end toward one end while shifting the fiber bundle such that a start point of the second-layer hoop layer is disposed adjacent to the center of the body portion 11 with respect to an end point of the first-layer hoop layer and shifting the fiber bundle such that an end point of the second-layer hoop layer is disposed adjacent to the center of the body portion 11 with respect to the start point of the first-layer hoop layer. After that, when third-layer, fourth-layer . . . Nth-layer hoop layers are sequentially shifted and laminated in the same manner, the inner hoop layer 22 having the inclined ends 221, 222 is formed.

The first part reinforcement layer 24 is a reinforcement layer mainly for the first dome-shaped portion 12, and the second part reinforcement layer 25 is a reinforcement layer mainly for the second dome-shaped portion 13. The two part reinforcement layers each have a dome shape and differ from each other in whether the layer has an opening through which the end fitting 30 is inserted. In other words, the first part reinforcement layer 24 has the opening through which the end fitting 30 is inserted, and the second part reinforcement layer 25 does not have an opening. Hereinafter, an example of the first part reinforcement layer 24 will be described, and the description of the second part reinforcement layer 25 is simplified.

As shown in FIG. 1 and FIG. 2, the first part reinforcement layer 24 is disposed from an apex side of the first dome-shaped portion 12 across the boundary 14 between the first dome-shaped portion 12 and the body portion 11 to part of the body portion 11. Here, part of the body portion 11 is, for example, in the range of 100 mm to 200 mm from the boundary 14. The end 241, adjacent to the body portion 11, of the first part reinforcement layer 24 is inclined from the outside of the tank 1 toward the inside such that the thickness reduces. The end 241 is disposed adjacent to the center of the body portion 11 with respect to the inclined end 221 of the inner hoop layer 22.

The first part reinforcement layer 24 is formed by placing a resin-impregnated fiber bundle on part of the outer peripheries of the inner helical layer 21 and the inner hoop layer 22 in multiple layers with, for example, an automated fiber placement (AFP) method. The first part reinforcement layer 24 is formed by, for example, sticking prepreg made of carbon fiber reinforced plastics (CFRP) to part of the outer peripheries of the inner helical layer 21 and the inner hoop layer 22 by using an automated fiber placement machine.

A method of forming the inclined end 241 of the first part reinforcement layer 24 includes, for example, forming a first layer and then forming a second layer on the first layer by sticking a resin-impregnated fiber bundle while shifting the fiber bundle such that a second-layer end point is disposed adjacent to the apex of the first dome-shaped portion 12 with respect to a first-layer end point. After that, when a third layer, a fourth layer . . . an Nth layer of fiber bundles are sequentially shifted and laminated in the same manner, the first part reinforcement layer 24 having the end 241 that is inclined is formed.

The first part reinforcement layer 24 may be formed by using a mandrel having the same outside diameters as the inner helical layer 21 and the inner hoop layer 22. In this case, the first part reinforcement layer 24 formed on the mandrel may be removed from the mandrel after being cured and then fitted to the inner helical layer 21 and the inner hoop layer 22, or may be removed from the mandrel in an uncured state and then fitted to the inner helical layer 21 and the inner hoop layer 22.

However, a gap is hard to occur due to pressing with a roller in the automated fiber placement machine, so the first part reinforcement layer 24 is preferably formed by directly laminating a fiber bundle on the outer peripheries of the inner helical layer 21 and the inner hoop layer 22. Since the occurrence of a gap is suppressed in this way, adhesion between the first part reinforcement layer 24 and each of the inner helical layer 21 and the inner hoop layer 22 improves, with the result that interlayer peeling is suppressed. The width of the resin-impregnated fiber bundle, used in the AFP method may be different from the width of a resin-impregnated fiber bundle, used in the FW method.

As shown in FIG. 1, the second part reinforcement layer 25 is disposed from an apex side of the second dome-shaped portion 13 across the boundary 15 between the second dome-shaped portion 13 and the body portion 11 to part of the body portion 11. The end 251, adjacent to the body portion 11, of the second part reinforcement layer 25 is inclined from the outside of the tank 1 toward the inside such that the thickness reduces. The end 251 is disposed adjacent to the center of the body portion 11 with respect to the inclined end 222 of the inner hoop layer 22.

The outer hoop layer 26 is disposed outside the first part reinforcement layer 24 and the second part reinforcement layer 25 and is formed so as to press the end 241 of the first part reinforcement layer 24 and the end 251 of the second part reinforcement layer 25. Specifically, as shown in FIG. 1, the outer hoop layer 26 is disposed at a location corresponding to the body portion 11 of the liner 10 in a state where the end 241 of the first part reinforcement layer 24 and the end 251 of the second part reinforcement layer 25 are pressed. The outer hoop layer 26 is formed over the entire length of the body portion 11. The outer hoop layer 26 has a first portion 261, a second portion 262, and a third portion 263. The first portion 261 covers part of the first part reinforcement layer 24 including the end 241. The second portion 262 covers part of the second part reinforcement layer 25 including the end 251. The third portion 263 covers the inner hoop layer 22 between the first part reinforcement layer 24 and the second part reinforcement layer 25.

An end of the first portion 261 is inclined from the outside of the tank 1 toward the inside such that the thickness reduces. Similarly, an end of the second portion 262 is inclined from the outside of the tank 1 toward the inside such that the thickness reduces. With this configuration, a step is less likely to be formed at any of these ends. Therefore, at the time of forming the outer helical layer 27 outside the outer hoop layer 26, the influence of a step on the outer helical layer 27 is reduced, so interlayer peeling is reduced.

The outer hoop layer 26 is, for example, formed by hoop winding of a resin-impregnated fiber bundle on the outer peripheries of the first part reinforcement layer 24, the second part reinforcement layer 25, and the inner hoop layer 22 between the first part reinforcement layer 24 and the second part reinforcement layer 25 so as to press the end 241 of the first part reinforcement layer 24 and the end 251 of the second part reinforcement layer 25.

The outer helical layer 27 is a layer located in the outermost side of the reinforcement layer 20 and is formed so as to cover the first part reinforcement layer 24, the second part reinforcement layer 25, and the outer hoop layer 26. The outer helical layer 27 is, for example, formed by helical winding of a resin-impregnated fiber bundle on the outer peripheries of the first part reinforcement layer 24, the second part reinforcement layer 25, and the outer hoop layer 26.

On the other hand, the end fitting 30 is obtained by machining a metal material, such as a stainless steel and an aluminum alloy, into a predetermined shape. The end fitting 30 has an end fitting body portion 31 and a flange portion 32. The end fitting body portion 31 has a substantially cylindrical shape and extends in the axis L direction of the tank 1. The flange portion 32 is formed integrally with the end fitting body portion 31 and extends in a radial direction of the tank 1. A communication hole 33 is provided in the end fitting body portion 31. The communication hole 33 communicates with the storage space 2 of the tank 1. An internal threaded portion for being screwed to the valve 40 is formed on an inner peripheral wall (that is, a portion forming the communication hole 33) of the end fitting body portion 31.

The valve 40 is a member for filling and discharging hydrogen gas to and from the storage space 2 of the tank 1. The valve 40 is made of a metal material, such as a stainless steel and an aluminum alloy. The valve 40 is inserted in the communication hole 33 so as to close the end fitting 30 and is screwed to the end fitting 30 with an external threaded portion formed on the outer peripheral wall of the valve 40.

The tank 1 according to the present embodiment includes the first part reinforcement layer 24 and the second part reinforcement layer 25. The first part reinforcement layer 24 is disposed from the apex side of the first dome-shaped portion 12 across the boundary 14 between the first dome-shaped portion 12 and the body portion 11 to part of the body portion 11. The second part reinforcement layer 25 is disposed from the apex side of the second dome-shaped portion 13 across the boundary 15 between the second dome-shaped portion 13 and the body portion 11 to part of the body portion 11. Therefore, the first dome-shaped portion 12 is reinforced by the first part reinforcement layer 24, and the second dome-shaped portion 13 is reinforced by the second part reinforcement layer 25. For this reason, the amount of helical layer used to reinforce the dome-shaped portions is reduced, so an amount to form a helical layer on the body portion also reduces with formation of the helical layer. As a result, the strength of each of the first dome-shaped portion 12 and the second dome-shaped portion 13 is ensured, and the usage of fiber reinforced resin is reduced as compared to an existing art.

Since the end 241 of the first part reinforcement layer 24 and the end 251 of the second part reinforcement layer 25 each are inclined from the outside of the tank 1 toward the inside such that the thickness reduces, a step is less likely to be formed at any of these ends. Thus, the influence of a step on the outer hoop layer 26 is reduced. Therefore, meandering of a fiber bundle is suppressed at the time of forming the outer hoop layer 26 outside the end 241 of the first part reinforcement layer 24 and the end 251 of the second part reinforcement layer 25. Hence, a gap between the first part reinforcement layer 24 and the outer hoop layer 26 disposed outside the first part reinforcement layer 24 and a gap between the second part reinforcement layer 25 and the outer hoop layer 26 disposed outside the second part reinforcement layer 25 are suppressed, so adhesion with the outer hoop layer 26 is enhanced, and interlayer peeling is suppressed. As a result, the end 241 of the first part reinforcement layer 24 and the end 251 of the second part reinforcement layer 25 each are stably pressed by the outer hoop layer 26, so the first part reinforcement layer 24 and the second part reinforcement layer 25 are reliably fixed by the outer hoop layer 26.

The reinforcement layer 20 further includes the inner hoop layer 22 disposed inside the first part reinforcement layer 24 and the second part reinforcement layer so as to sandwich the end 241 of the first part reinforcement layer 24 and the end 251 of the second part reinforcement layer 25 with the outer hoop layer 26. With this configuration, by sandwiching the end 241 of the first part reinforcement layer 24 and the end 251 of the second part reinforcement layer 25 with the outer hoop layer 26 and the inner hoop layer 22, the end 241 of the first part reinforcement layer 24 and the end 251 of the second part reinforcement layer 25 are reliably stabilized.

Since both ends of the inner hoop layer 22 are the inclined ends 221, 222, a step is less likely to be formed at any of these inclined ends 221, 222, so the influence of a step on the first part reinforcement layer 24 and the second part reinforcement layer 25 is reduced. Therefore, a gap between the inner hoop layer 22 and the first part reinforcement layer 24 disposed outside the inner hoop layer 22 and a gap between the inner hoop layer 22 and the second part reinforcement layer 25 disposed outside the inner hoop layer 22 are reduced to enhance adhesion between the inner hoop layer 22 and the first part reinforcement layer 24 and adhesion between the inner hoop layer 22 and the second part reinforcement layer 25, so interlayer peeling is suppressed.

In addition, the end 241 of the first part reinforcement layer 24 is disposed adjacent to the center of the body portion 11 with respect to the inclined end 221 of the inner hoop layer 22, and the end 251 of the second part reinforcement layer 25 is disposed adjacent to the center of the body portion 11 with respect to the inclined end 222 of the inner hoop layer 22. With this configuration, the end 241 of the first part reinforcement layer 24 and the end 251 of the second part reinforcement layer 25 are disposed on the body portion 11 that is relatively flat, so the ends 241, 251 are stably pressed by the outer hoop layer 26.

Second Embodiment

Figure 3:
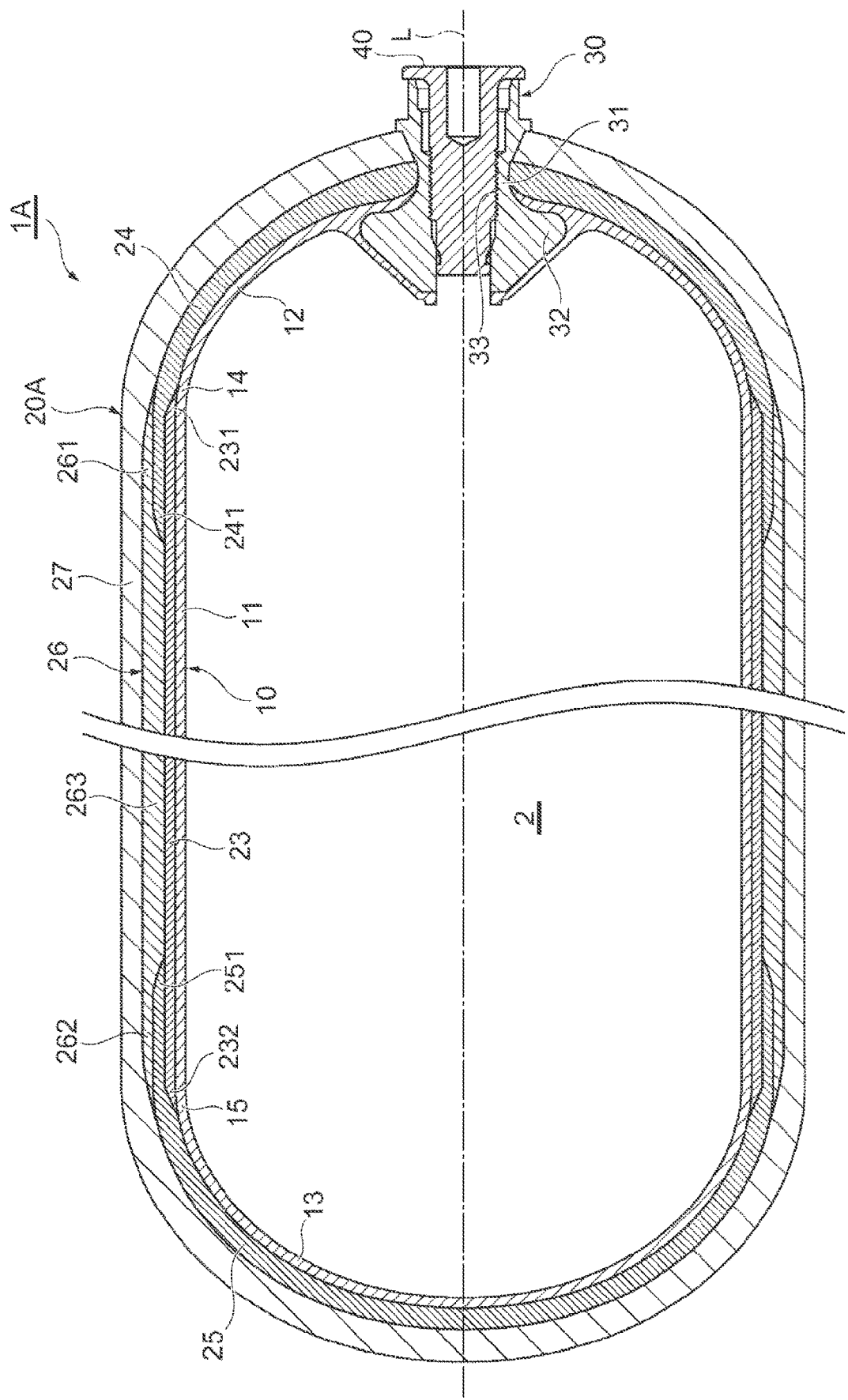
FIG. 3 is a sectional view that shows a tank according to a second embodiment.
Figure 4:
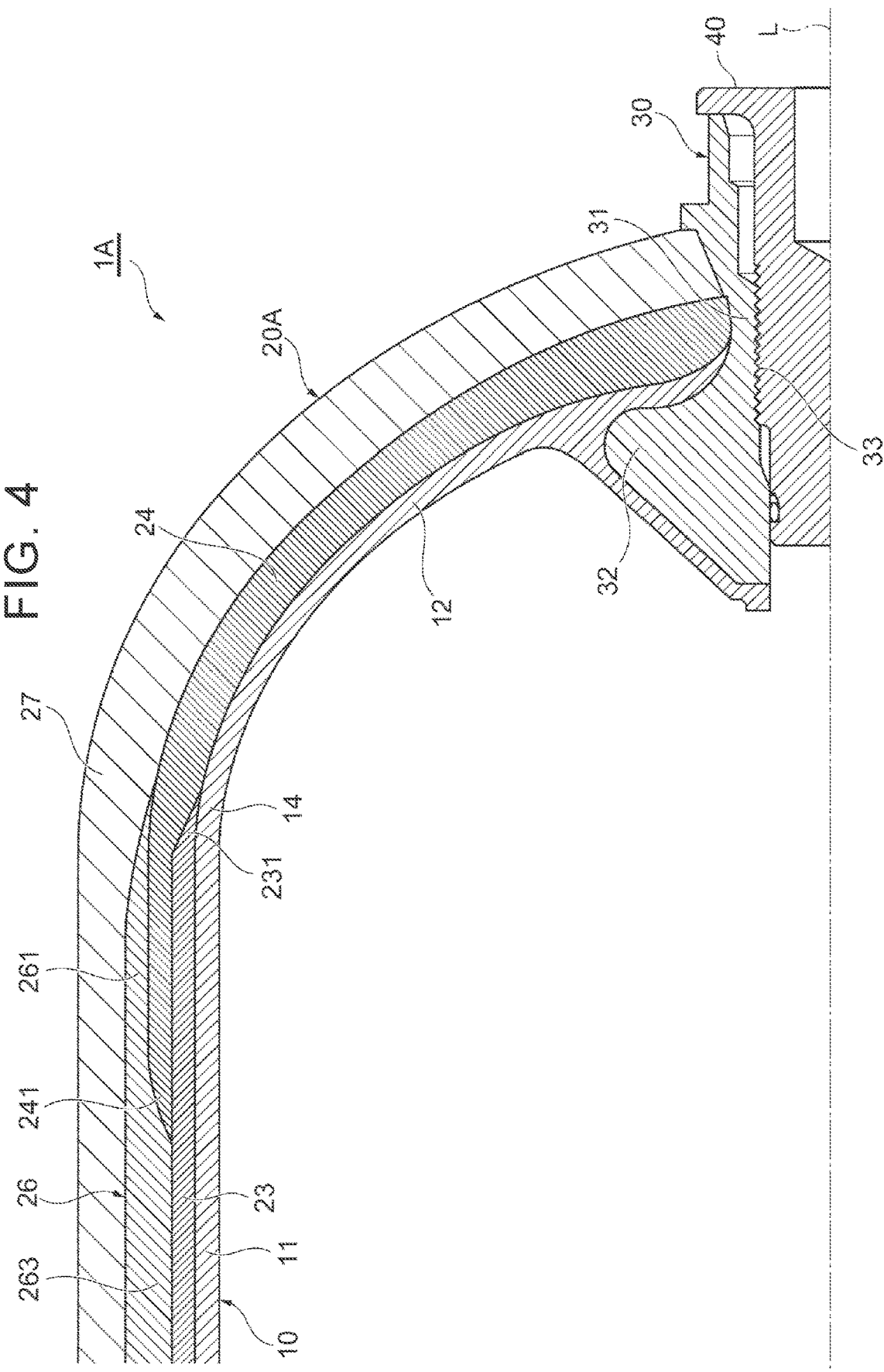
FIG. 4 is a partially enlarged sectional view that shows the tank according to the second embodiment.

Hereinafter, a second embodiment of a tank will be described with reference to FIG. 3 and FIG. 4. The tank 1A according to the present embodiment differs from that of the first embodiment in that the inner helical layer 21 is not provided and an inner hoop layer 23 made up of split elements manufactured in advance is provided instead of the inner hoop layer 22. Hereinafter, only the difference will be described.

Specifically, a reinforcement layer 20A includes the inner hoop layer 23, the first part reinforcement layer 24, the second part reinforcement layer 25, the outer hoop layer 26, and the outer helical layer 27. The inner hoop layer 23 covers the body portion 11 of the liner 10. The first part reinforcement layer 24 is disposed outside the inner hoop layer 23 and covers the first dome-shaped portion 12 and part of the inner hoop layer 23. The second part reinforcement layer 25 is disposed outside the inner hoop layer 23 and covers the second dome-shaped portion 13 and part of the inner hoop layer 23. The outer hoop layer 26 is formed so as to press the end 241 of the first part reinforcement layer 24 and the end 251 of the second part reinforcement layer 25. The outer helical layer 27 is disposed outside the outer hoop layer 26 and formed so as to cover the whole of the liner 10.

The inner hoop layer 23 is formed so as to directly cover the outer periphery of the body portion 11. The inner hoop layer 23 is made up of split elements having a cylindrical shape and manufactured in advance and is fitted to the body portion 11 of the liner 10. In the axial direction (that is, the axis L direction of the tank 1A) of the body portion 11, one end (for example, an end close to the first dome-shaped portion 12) of the inner hoop layer 23 is an inclined end 231 that is inclined from the outside of the tank 1A toward the inside such that the thickness reduces. The other end (for example, an end close to the second dome-shaped portion 13) of the inner hoop layer 23 is an inclined end 232 that is inclined from the outside of the tank 1A toward the inside such that the thickness reduces.

The inner hoop layer 23 is, for example, formed by hoop winding of a resin-impregnated fiber bundle in multiple layers on the outer periphery of a mandrel having a cylindrical shape and then removing the layer from the mandrel after being cured. The mandrel is, for example, made of a metal and has the same outside diameter as the outside diameter of the body portion 11 of the liner 10.

A method of forming the inclined ends 231, 232 of the inner hoop layer 23 includes, for example, forming a first-layer hoop layer by hoop winding of a resin-impregnated fiber bundle from one end toward the other end in the axial direction of the mandrel, forming a second-layer hoop layer by hoop winding of the fiber bundle from the other end of the mandrel toward one end while shifting the fiber bundle such that a start point of the second-layer hoop layer is disposed adjacent to the center of the mandrel with respect to an end point of the first-layer hoop layer and shifting the fiber bundle such that an end point of the second-layer hoop layer is disposed adjacent to the center of the mandrel with respect to the start point of the first-layer hoop layer. After that, when third-layer, fourth-layer . . . Nth-layer hoop layers are sequentially shifted and laminated in the same manner, the inner hoop layer 23 having the inclined ends 231, 232 is formed.

The inner hoop layer 23 manufactured in this way is fitted to the body portion 11 of the liner 10 in a state where the liner 10 is inserted inside. To suppress misalignment, an adhesive or the like is preferably filled between the body portion 11 and the inner hoop layer 23.

In the present embodiment, the first part reinforcement layer 24 is formed so as to directly cover the first dome-shaped portion 12 of the liner 10, and the second part reinforcement layer 25 is formed so as to directly cover the second dome-shaped portion 13 of the liner 10. The end 241 of the first part reinforcement layer 24 and the end 251 of the second part reinforcement layer 25 are sandwiched by the outer hoop layer 26 and the inner hoop layer 23.

With the tank 1A according to the present embodiment, operation and advantageous effects similar to those of the first embodiment are obtained. In addition, since the inner hoop layer 23 is made up of split elements having a cylindrical shape and manufactured in advance, the inner hoop layer 23 is easily manufactured as compared to when an inner hoop layer is formed by directly winding a fiber bundle on the body portion 11.

Since both ends of the inner hoop layer 23 are the inclined ends 231, 232, a step is less likely to be formed at any of these inclined ends 231, 232, so the influence of a step on the first part reinforcement layer 24 and the second part reinforcement layer 25 is reduced. Therefore, a gap between the inner hoop layer 23 and the first part reinforcement layer 24 disposed outside the inner hoop layer 23 and a gap between the inner hoop layer 22 and the second part reinforcement layer 25 disposed outside the inner hoop layer 23 are reduced to enhance adhesion between the inner hoop layer 23 and the first part reinforcement layer 24 and adhesion between the inner hoop layer 23 and the second part reinforcement layer 25, so interlayer peeling is suppressed.

In addition, the end 241 of the first part reinforcement layer 24 is disposed adjacent to the center of the body portion 11 with respect to the inclined end 231 of the inner hoop layer 23, and the end 251 of the second part reinforcement layer 25 is disposed adjacent to the center of the body portion 11 with respect to the inclined end 232 of the inner hoop layer 23. In this way, when the end 241 of the first part reinforcement layer 24 and the end 251 of the second part reinforcement layer 25 are disposed on the body portion 11 that is relatively flat, the ends 241, 251 are stably pressed by the outer hoop layer 26.

The embodiments of the disclosure have been described in detail; however, the disclosure is not limited to the above-described embodiments. Various design changes are applicable without departing from the spirit of the disclosure described in the appended claims.

For example, in the above-described embodiments, an example in which the end 241 of the first part reinforcement layer 24 and the end 251 of the second part reinforcement layer 25 are sandwiched by the outer hoop layer 26 and the inner hoop layer 22 or the inner hoop layer 23, that is, an example in which the ends of the part reinforcement layers are sandwiched by two hoop layers have been described; however, the disclosure is not limited thereto. For example, a hoop layer may be disposed outside the end 241 of the first part reinforcement layer 24 and the end 251 of the second part reinforcement layer 25, and a helical layer may be disposed inside the end 241 of the first part reinforcement layer 24 and the end 251 of the second part reinforcement layer 25.

What is claimed is:

1. A tank comprising:
   a liner having a body portion with a cylindrical shape, and a pair of dome-shaped portions respectively provided at both ends of the body portion in an axial direction of the body portion; and
   a reinforcement layer covering the liner and made of a fiber reinforced resin that is a resin-impregnated fiber bundle, wherein
   the reinforcement layer includes
      a part reinforcement layer disposed from an apex side of each of the dome-shaped portions across a boundary between the dome-shaped portion and the body portion to part of the body portion, and
      an outer hoop layer disposed outside the part reinforcement layer and provided so as to press an end, adjacent to the body portion, of the part reinforcement layer,
   wherein the reinforcement layer further includes an inner hoop layer disposed inside the part reinforcement layer so as to sandwich the end of the part reinforcement layer with the outer hoop layer, wherein an inclined end of the part reinforcement layer is made by forming a first layer and then forming a second layer on the first layer by sticking a resin-impregnated fiber bundle while shifting the fiber bundle such that an end point of the second layer is disposed adjacent to the apex side of the dome-shaped portion with respect to an end point of the first layer, and both ends of the inner hoop layer in the axial direction each are an inclined end inclined from an outside of the tank toward an inside of the tank such that a thickness of the inclined end reduces, the end of the part reinforcement layer extends axially toward a center of the body portion with respect to the inclined end of the inner hoop layer, and wherein the end of the part reinforcement layer is inclined from an outside of the tank toward an inside of the tank such that a thickness of the end reduces.

\* \* \* \* \*